United States Patent [19]

Tallent et al.

[11] 3,860,952

[45] Jan. 14, 1975

[54] VIDEO TIME BASE CORRECTOR

[75] Inventors: Michael W. Tallent, San Jose; Lee E. Scaggs, Mountain View; Allan L. Swain, Palo Alto; Ronnie M. Harrison, San Jose; William B. Hendershot, III, San Jose, all of Calif.

[73] Assignee: Consolidated Video Systems, Inc., Santa Clara, Calif.

[22] Filed: July 23, 1973

[21] Appl. No.: 381,463

[52] U.S. Cl. .......................................... 358/8, 360/36
[51] Int. Cl. .............................. H04n 5/76, H04n 9/02
[58] Field of Search ................. 358/4, 8; 360/26, 36

[56] References Cited

UNITED STATES PATENTS

| | | | |
|---|---|---|---|
| 2,960,568 | 11/1960 | Leyton | 360/36 |
| 3,617,626 | 11/1971 | Bluth et al. | 358/4 |
| 3,716,663 | 2/1973 | Bolger | 358/8 |
| 3,761,646 | 9/1973 | Beauviala | 360/26 |

*Primary Examiner*—Richard Murray
*Attorney, Agent, or Firm*—Townsend and Townsend

[57] ABSTRACT

A time base corrector for processing television signals to remove time base errors introduced during signal recording, reproducing, or transmission. Incoming video signals are converted from analog to digital form and temporarily stored in a memory unit. Time base errors are removed from the video signals by storing the digitized signals at a clocking rate which varies in a manner generally proportional to the time base errors and fetching these stored signals at a standard clocking rate. The clocking signal for storing the digitized information is derived from an input voltage controlled oscillator whose frequency is dependent upon the frequency content of the instantaneous incoming video line information; the clocking signal for fetching is derived from a frequency standard. After storage and retrieval, the digitized video information is reconverted to analog form, processed and coupled to an output terminal.

45 Claims, 11 Drawing Figures

VIDEO TIME BASE CORRECTOR

BACKGROUND OF THE INVENTION

1. Field of the Invention

This invention relates to the processing of television signals to improve the information content thereof. More particularly, this invention relates to the processing of television signals to remove time base errors introduced during signal recording, reproducing or transmission.

2. Description of the Prior Art

In the art of television broadcasting, television signals are frequently recorded on magnetic tape and subsequently reproduced for later broadcasting or viewing purposes.

Video tape recorders used for this purpose generally fall into one of two categories: capstan servo recorders or non-capstan servo recorders. The former are characterized by a synchronizing scheme in which the recorder is locked to an external reference frequency provided by a standard frequency generator ordinarily located in the television broadcast studio; the latter are characterized by a synchronizing scheme in which the recorder is snychronized by an internally generated reference frequency.

In many cases, pre-recorded television program material must be mixed with live broadcast material; in other instances, e.g. during studio previewing or home viewing, the pre-recorded information signals are viewed without mixing. In all cases, due to the time dependent nature of television signals, care must be taken to avoid the introduction of time base errors when reproducing the pre-recorded television material since such time base errors cause a frequency shift of the reproduced signals which can result in many observable undesirable effects.

During the reproduction of recorded video signals by either type of video tape recorder, however, frequency errors are usually introduced by several factors. These factors include expansion or contraction of the recording medium during or after recording, variation in the speed of the tape past the tape head during recording or reproduction, variance between the tape recording speed and the tape reproduction speed (even though each speed is substantially constant) and the like. Thus, due to the limitations inherent in recording or reproducing systems utilizing mechanical elements, and the relatively high frequencies involved in television signals, all known video tape recorders introduce such time base errors. Such errors can also be introduced by other devices employed in the transmission of television signals. If these signals are employed without further processing as the input to a video receiver or other follow-on device, a degraded picture is reproduced, the degradation usually appearing when small time base errors are involved as a smeared or jittery picture with erroneous intensity variations and, in the case of color video signals, improper color display. When the time base errors are great, the picture will fail to lock horizontally or vertically. Accordingly, the reproduced television signals must be electronically processed to minimize time base errors.

Time base correctors are known which are employed for the purpose of minimizing such time base errors from television video signals. These time base correctors customarily employ tapped delay lines, or other variable delay elements, for introducing variable delay in the incoming video signals in order to compensate in an analog fashion for the undesired frequency variations in the input signals.

Known time base correctors suffer from several disadvantages. Some are compatible with only one particular type of video tape recorder. Such time base correctors require the concurrent use of a specific type of video tape recorder which may not be well adapted for the user's overall requirements. Other known time base correctors are compatible with several types of video tape recorders, but are extremely expensive to manufacture and require frequent calibration, thereby requiring extensive maintenance costs. All known time base correctors suffer from the extreme disadvantage of affording only an extremely narrow useful correction range, typically in the order of ± 2.2 microseconds. Since the length of a standard NTSC single line of television information is approximately 63.56 microseconds, such devices are only capable of removing minor time base errors.

SUMMARY OF THE INVENTION

The invention comprises a time base corrector for processing television signals which is inexpensive to manufacture and maintain, which affords an extremely wide useful correction range of ± 1.5 lines of video information (i.e., ± 95.34 microseconds) and which is compatible with all capstan servo video tape recorders. In the preferred embodiment incoming video information is converted from analog to digital form and stored momentarily in a memory unit. The sampling rate and the clocking rate for storing the digitized information are derived from an input voltage controlled oscillator whose frequency is dependent upon the frequency content of the instantaneous incoming video line of information. After storage, the digitized video information is clocked out from the memory unit at a standard rate, reconverted to analog form, processed and furnished to an output terminal for use with follow-on circuitry.

The input voltage controlled oscillator circuit has a first phase lock loop controlled by the frequency of successive horizontal sync pulses in the incoming video signal, and a second phase lock loop controlled by the color burst frequency of the burst portion portion of successive lines of video information. Frequency deviations in the incoming signals are converted to error voltages, which are summed and used to control the frequency of the voltage controlled oscillator.

The memory unit comprises a plurality of memories each capable of storing a plurality of horizontal lines of video information. A unique sequence control unit controls the selection of each memory for writing and reading in such a manner that double clocking of a single memory which marginally occurs at the extreme boundaries of the correction range is quickly relieved.

The signals for clocking the digitized information out from the memory unit are obtained from an output voltage controlled oscillator driven by a frequency standard coupled from an internal sync generator or an external sync generator via an operator controlled switching network. Various sync signals obtained from either the internal sync generator or the studio sync generator are coupled via the switching network to a processor amplifier in which the sync signals are added to the time base corrected video information signals.

For a fuller understanding of the objects and advantages of the invention, reference should be had to the following detailed description taken in conjunction with the accompanying drawings.

DESCRIPTION OF THE PREFERRED EMBODIMENT

Figure 1:
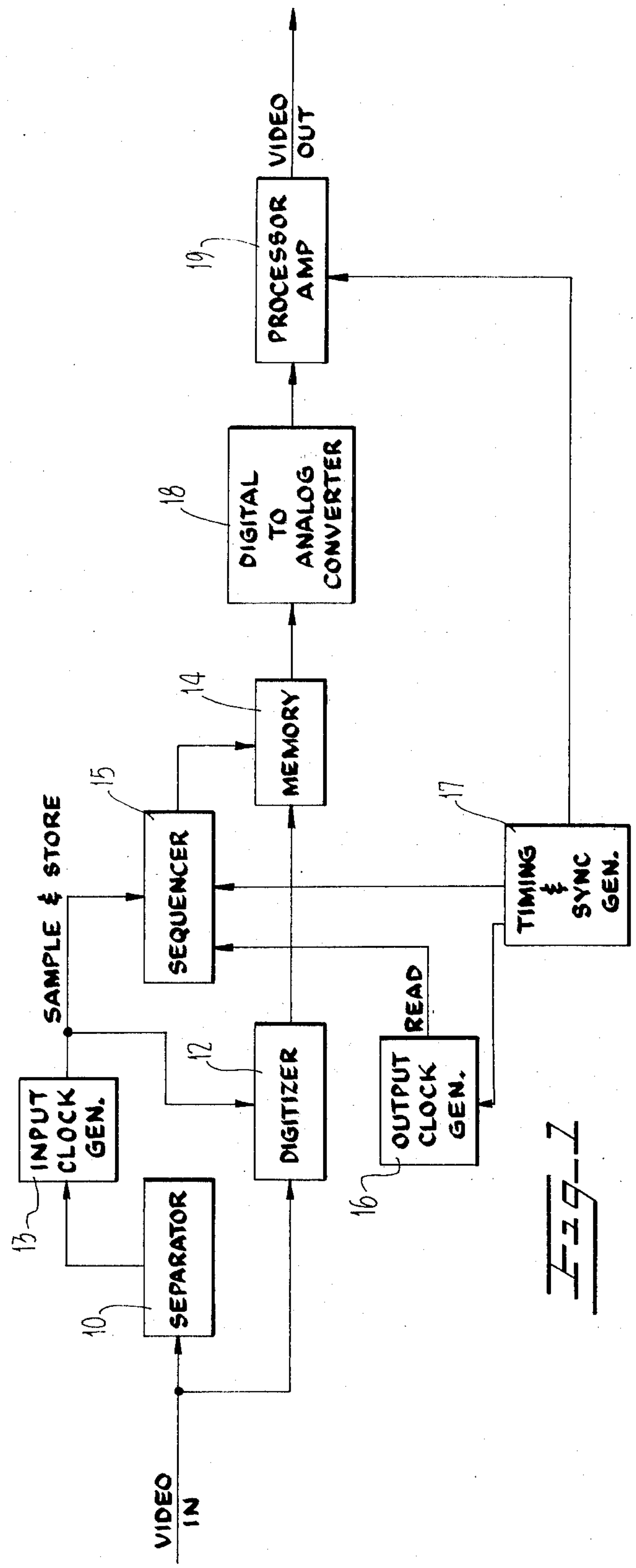
FIG. 1 is a schematic block diagram of the invention.

Turning now to the drawings, FIG. 1 shows a schematic block diagram of the basic elements of the invention. Composite video signals from a capstan servo video tape recorder or other servo-type source are coupled to the input of a separator 10 and also to the input of a digitizer 12. Separator 10 strips the composite video signals of the sync and, in the case of color video signals, color burst portions and applies these portions of the video signal to an input clock generator 13. Input clock generator 13 produces high frequency sample and store signals whose frequency is dependent upon frequency of the signal input thereto from separator 10 in the manner described below to compensate for time base errors in the incoming video signals. The sample and store signals from input clock generator 13 control the sampling rate of digitizer 12 and specify the rate at which sampled signals are stored in memory unit 14. Digitizer 12 converts the analog composite video signals input thereto into digital form at the sampling rate provided by input clock generator 13. After conversion, the digital signals are stored in memory unit 14 at the store rate provided by input clock generator 13. A sequencer 15 controls the operation of memory unit 14 in such a manner as to enable the section of memory unit 14 into which digital information is to be stored and to couple the store signals thereto.

After storage in memory unit 14, the digitized video information if fetched from memory unit 14 in accordance with read signals from an output clock generator 16 at a standard reading rate. This standard reading rate is provided by a timing and sync generator 17, which may be a broadcast studio generator or a unit internal to the time base corrector. Timing and sync generator 17 is also coupled to sequencer 15 in order to provide reference timing signals for synchronizing the operation of sequencer 15 to sequentially select different portions of memory unit 14 for fetching data therefrom. The digitized video information from memory unit 14 is coupled to a digital-to-analog converter 18 which converts the time base corrected digitized video information to analog form. The corrected analog video signals are coupled to a processor amplifier 19 in which color burst and composite sync signals (i.e., horizontal and vertical sync pulses and equalizer pulses) are added to the time base corrected analog video information signals. The composite corrected video appears at the output of processor amplifier 19.

Time base correction of the incoming video signals is achieved according to the invention by varying the sampling and storing rate of each line of video in accordance with the frequency content of the uncorrected video signals and maintaining a constant standard reading rate. In the preferred embodiment described below, variation of the rate at which succeeding horizontal sync pulses occur in the input video signal and deviation of the color burst frequency in each successive line of the input video signal from the standard color burst frequency $f_c$ both produce an error signal which alters the frequency of the sample and store signals at the output of input clock generator 13. Variation of the frequency of the sample and store signals from input clock generator 13 is generally in the same sense as the frequency deviation of the horizontal sync pulses and the color burst. Each incoming line of video information is thus sampled and stored at a rate which varies in accordance with frequency deviations intrinsic thereto to cancel the time base errors.

After the incoming video signals have been stored in the above manner, the corrected signals are read out from memory by sequencer 15 at the clock rate provided by output clock generator 16. The read clock rate is derived from the color burst frequency standard provided by timing and sync generator 17. The video information clocked out at the standard reading rate is converted to analog form by digital-to-analog converter 18. As noted above, the analog signals are finally combined with composite sync and color burst signals in processor amplifier 19 and presented to the output terminal. These additional reference signal portions are generated by the timing and sync generator 17.

Figure 2:
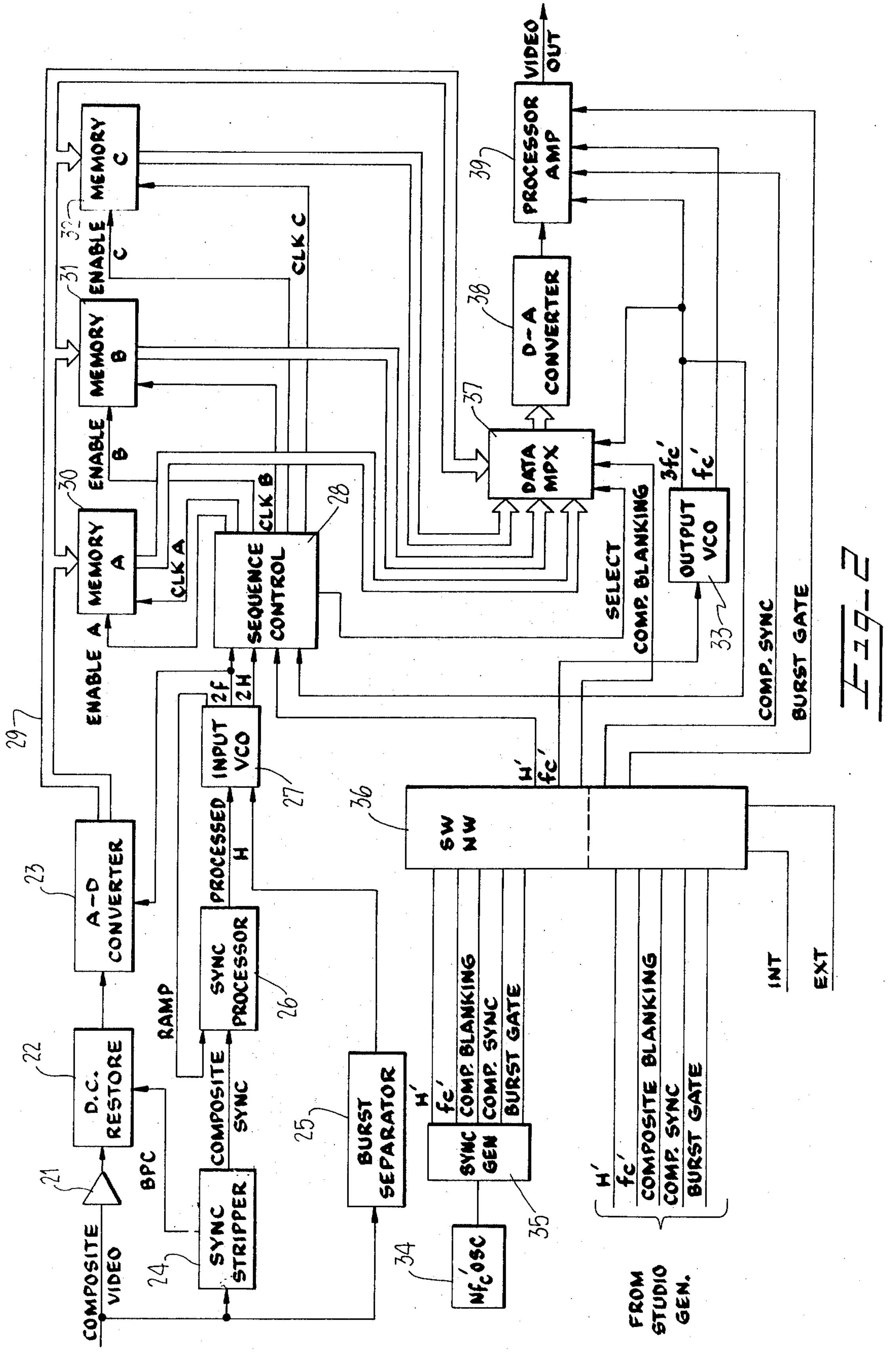
FIG. 2 is a schematic block diagram of the preferred embodiment showing the elements of FIG. 1 in more detail.

FIG. 2 illustrates a preferred embodiment of the invention especially adapted for use with capstan servo recorders. As will be evident to those skilled in the art, capstan servo recorders are ordinarily synchronized by means of a master timing and sync generator, usually termed a studio generator, which provides timing signals for synchronizing the operation of the recorder with other studio based equipment, e.g. the television camera electronics, the studio monitor, etc. Typical studio generators provide composite sync, burst gate and color burst frequency signals, all as reference signals for the various equipment to be synchronized.

Figure 5:
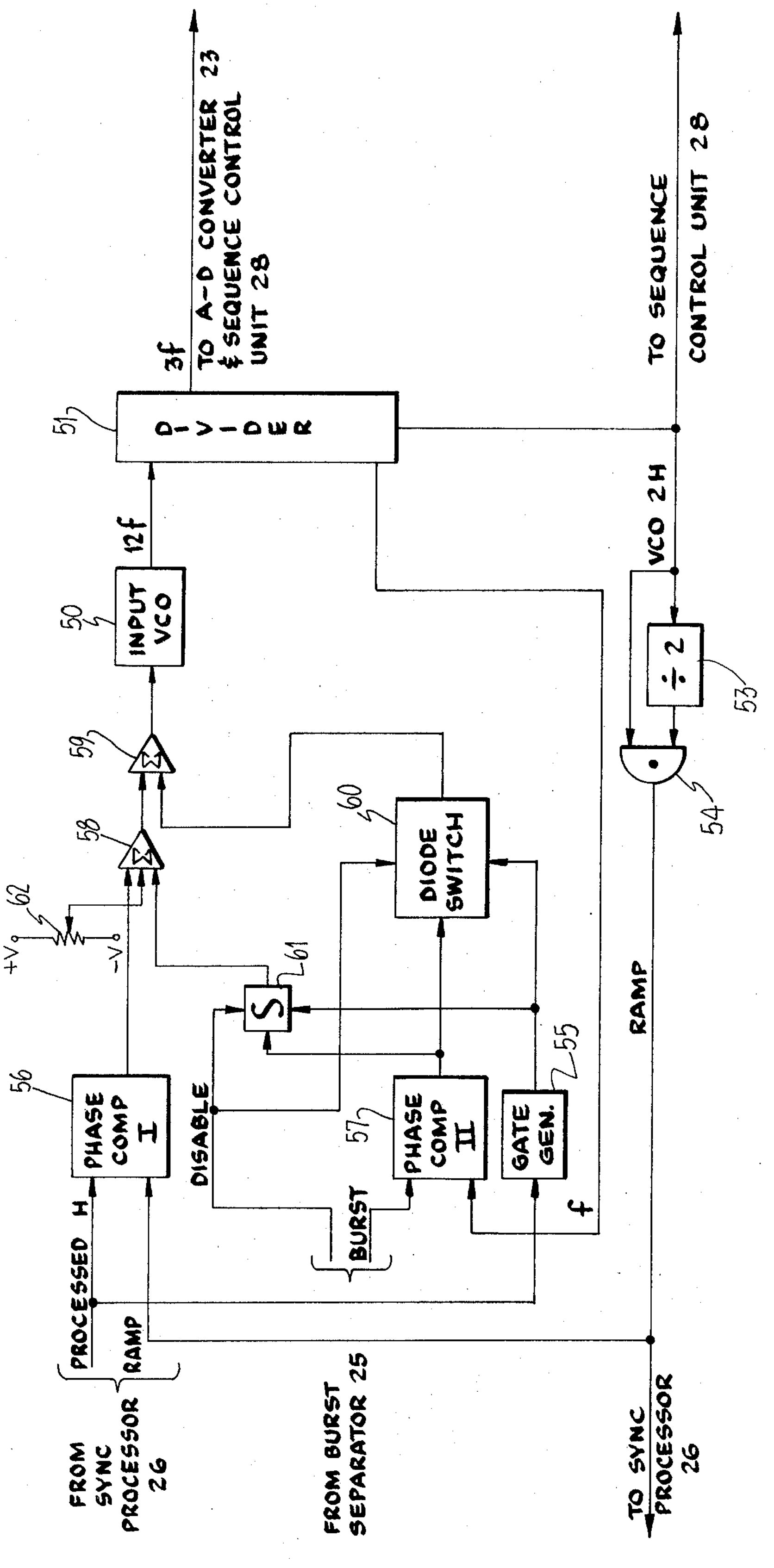
FIG. 5 is a schematic diagram illustrating the input VCO circuit of the preferred embodiment.
Figure 6:
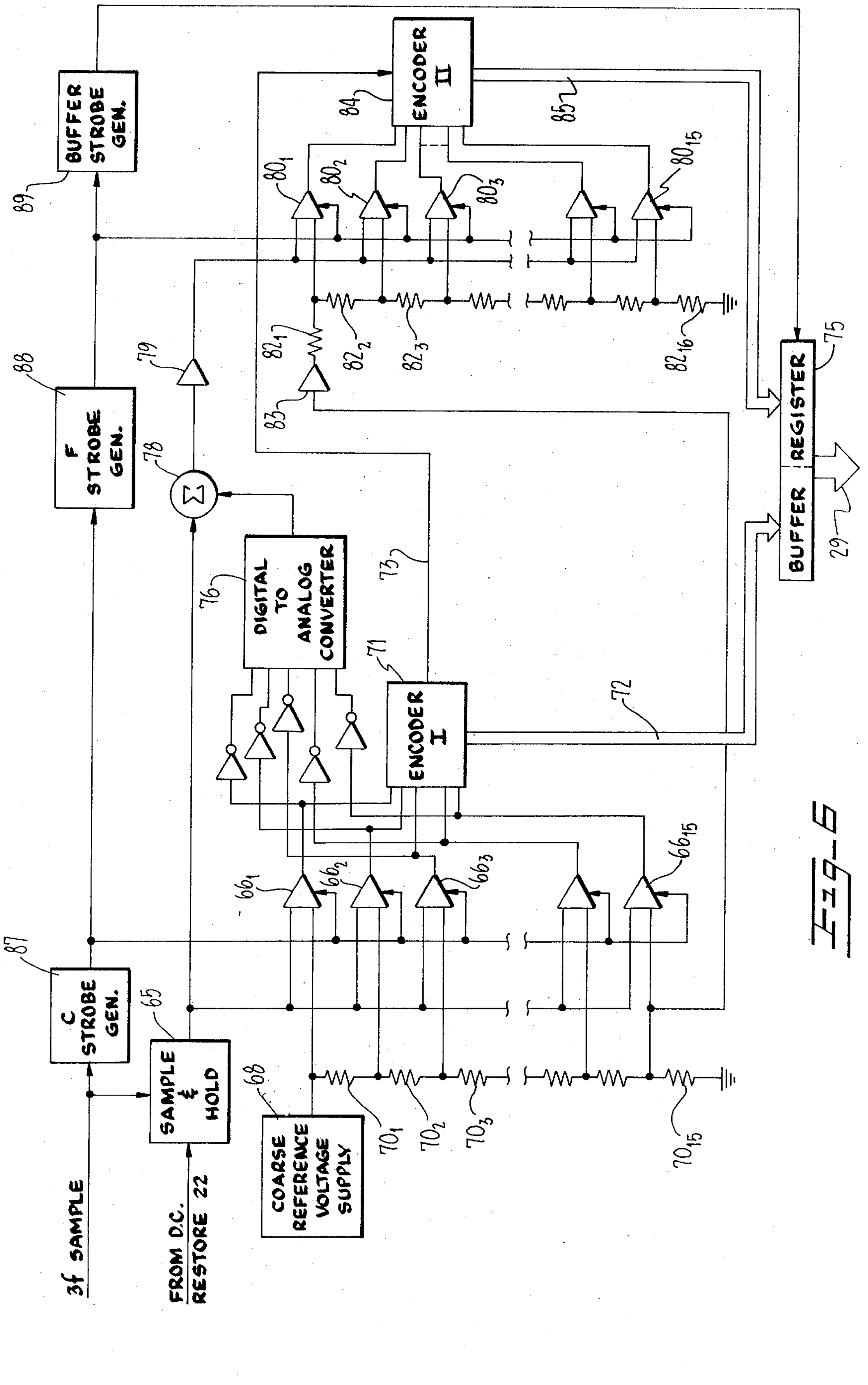
FIG. 6 is a schematic diagram illustrating the analog-to-digital converter of the preferred embodiment.

In the embodiment of FIG. 2 the composite video input signals are coupled via a conventional amplifier 21 and DC restore circuit 22 to the input of an analog-to-digital converter 23 shown in detail in FIG. 6. Analog-to-digital converter 23 converts the analog input signals to 8-bit digital characters. The composite video input signals are also coupled to a sync stripper 24 and a color burst separator 25. Sync stripper 24 is a conventional circuit for providing a back porch clamp reference signal along the lead labelled BPC to DC restoration circuit 22, and for providing composite sync from the input video signal to the input of a sync processor 26 shown in FIG. 3. Burst separator 25 is a conventional circuit for providing the color burst portion of each line of video information to the input of an input voltage controlled oscillator circuit 27 shown in FIG. 5. In addition, burst separator 25 is provided with conventional threshold detecting circuitry for generating a DISABLE signal whenever the color portion of a field of incoming video information lies below a predetermined threshold or the video is monochromatic. This DISABLE signal is coupled to input VCO circuit 27 for a purpose to be described.

Sync processor 26 provides processed horizontal sync information, hereinafter designated processed H, to input VCO circuit 27 for a purpose to be described.

Input VCO circuit 27 generates high frequency sample and store signals from processed H and color burst signals corrected in accordance with the frequency deviations in the input video signals. The sample signals are coupled to analog-to-digital converter 23 for controlling the rate at which incoming video signals are sampled. The store signals are coupled to sequence control unit 28 for use as a reference clock rate signal for storing the sampled portions of the video signals in the memory unit described below. In the preferred embodiment, the frequency of sample and store signals provided by input VCO circuit 27 is approximately $3 f_c$, where $f_c$ is the standard color burst frequency, it being remembered that the instantaneous frequency of the sample and store signals is a function of the time base errors in the video signals. Other multiples M/N (M, N both integers) $f_c$ may be employed for this purpose, if desired. Input VCO circuit 27 also generates a periodic reference signal, termed 2H, which is coupled to sequence control unit 28. In the preferred embodiment, the frequency of the 2H reference signal is approximately twice the frequency of standard horizontal sync pulses, corrected in accordance with frequency deviations in the input video signals. Thus, 2H provides a variable frequency standard for synchronizing the operation of a plurality of memory units in the manner described below. Input VCO circuit 27 also generates a reference signal, termed RAMP, which is coupled to sync processor 26 and which provides a variable frequency standard against which the arrival time of incoming horizontal sync pulses is measured by sync processor 26 in the manner described below.

The sampled video signals are coupled via data bus 29 from analog-to-digital converter 23 to three memory units, 30, 31, 32 and also directly to data multiplexer 37. Memory units 30, 31, 32 are controlled by sequence control unit 28 by a plurality of mode control signals ENABLE A, ENABLE B, ENABLE C and clock signals, CLOCK A, CLOCK B, CLOCK C.

Multiplexer 37 is controlled by SELECT signals generated by sequence control unit 28 which conditions multiplexer 28 to accept information at one of the four possible data inputs, viz. from one of memory units 30, 31, 32 or directly from analog-to-digital converter 23. In the preferred embodiment, each memory unit comprises an 8-bit by 2,048 word serial shift register with separate clock and enable inputs and capable of operation at high frequencies. Each memory unit is clocked at approximately $3 f_c$ (10.7 MHZ) which provides a storage capacity of three complete lines of video information per unit. If desired, other memory configurations may be employed without departing from the spirit of the invention. Also, shift registers having different line storage capacities may be similarly employed. Sampled video information is sequentially stored by cyclically enabling memory units 30, 31, 32 and serially storing three lines of digitized video information in each selected memory unit. For example, assuming the three most recently sampled lines of digitized video information were serially written into memory unit 30, sequence control unit 28 next enables memory unit 31 for storage of the next-succeeding three lines of information, after which memory unit 32 is enabled, then memory unit 30, etc.

Figure 9:
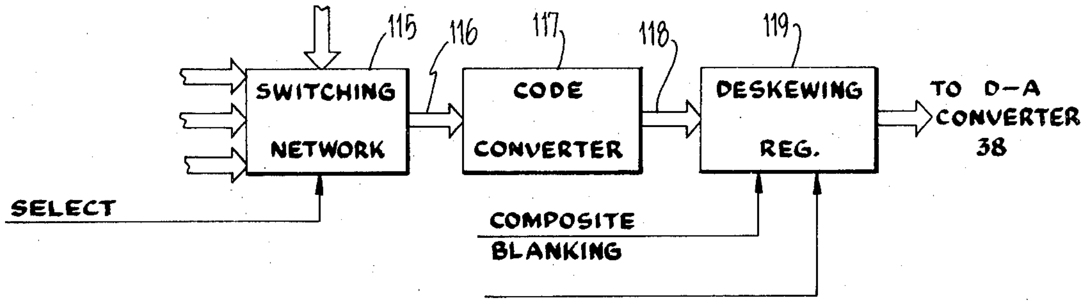
FIG. 9 is a schematic diagram illustrating the data multiplexer of the preferred embodiment.

Contemporaneously with the storage of sampled video information into a selected memory unit, sequence control unit 28 enables the video information stored in a different memory unit to be sequentially fetched to data multiplexer 37 shown in FIG. 9. Stored information is sequentially fetched in a manner similar to the store operation, viz., by cyclically enabling memory units 30, 31, 32 and sequentially fetching the three lines of video information from each enabled memory unit. As described more fully below, sequence control unit 28 is provided with means for resetting the contemporaneous read and write operation whenever the time base error is so gross as to require reading and writing from the same memory unit.

As noted above, during the write operation the clock signals supplied by sequence control unit 28 to memory units 30, 31, 32 are derived from the $3 f$ signals provided by input VCO circuit 27. During the read operation, the clock signals supplied by sequence control unit 28 are derived from a different reference signal $3 f_{c'}$ provided by an output voltage controlled oscillator circuit 33 shown in FIG. 10. Output VCO circuit 33 generates the $3 f_{c'}$ signals from a reference signal $f_{c'}$ supplied in the following manner.

A conventional high frequency oscillator 34 generates a clock signal at a multiple N of $f'_{c'}$, which in the preferred embodiment is $4f'_c$. This clock signal is coupled to the input of a conventional sync generator 35, which in the preferred embodiment is a Fairchild type 3261 TV sync generator. The horizontal sync pulses H' composite sync pulses, and composite blanking, burst gate and color frequency reference $f'_c$ signals are individually coupled from sync generator 35 to a first group of inputs of a switching network 36, preferably a type 74157 switching network. In addition, a second group of inputs are provided in switching network 36 which are adapted to be coupled by suitable means to an associated studio generator (not shown). A pair of mode control inputs labeled INTERNAL and EXTERNAL are coupled to an operator controlled switch (not shown). As will be apparent to those skilled in the art, when switching network 36 is enabled on the internal select input, the internally generated reference signals are coupled therethrough and furnished to the various units shown in FIG. 2. Similarly, when switching network 36 is enabled by the external select input, the reference signals from the associated studio generator are coupled therethrough and furnished to the various FIG. 2 units. Thus, the operation of the invention may be synchronized to a capstan servo recorder either by means of the internal sync generator or the external studio generator. As will be apparent to those skilled in the art, the internal sync generator of the invention may also be used as the studio generator.

The digital video information signals fetched line-by-line from memory units 30, 31, 32 or coupled directly from analog-to-digital converter 23 to data multiplexer 37 are processed therein in the manner noted below and coupled to the input of a digital-to-analog converter 38. In the preferred embodiment digital-to-analog converter 38 comprises a high speed eight bit binary digital-to-analog converter having an output settling time of 25 nanoseconds, such as a Datel type DAC HI digital-to-analog converter. The output of digital-to-analog converter 38 is coupled to a processor amplifier 39 shown in FIG. 11 along with burst gate and composite sync signals from switching network 36 and $f_c'$ and $3f_{c'}$ signals from output VCO circuit 33. As described more fully below, processor amplifier 39 mixes the time base corrected analog video signals with standard reference color burst and composite sync signals.

SYNC PROCESSOR

Figure 3:
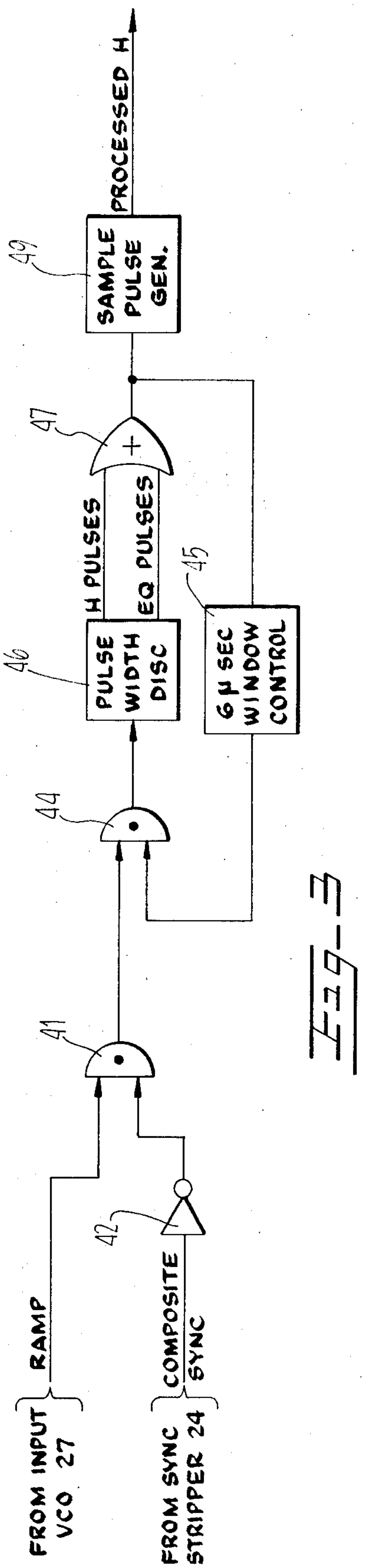
FIG. 3 is a schematic diagram illustrating the sync processor of the preferred embodiment.

Sync processor 26 provides preliminary screening and shaping of the incoming composite sync from sync stripper 24 before application in input VCO circuit 27. With reference to FIG. 3 RAMP signals from input VCO circuit 27 are coupled to a first input of an AND gate 41. The remaining input to AND gate 41 is the composite sync signal obtained from the output of sync stripper 24 and inverted by an inverter 42.

The output of AND gate 41 is coupleld to a first input of an AND gate 44, the other input to which is the output of a 6 micrososecond window control unit 45. The output of AND gate 44 is coupled to a conventional dual pulse width discriminator 46 comprising conventional pulse width discriminating circuits for recognizing horizontal sync pulses lying in the range from about 4.2 to 5.4 microseconds and equalizer pulses lying in the range from about 2.0 to 2.7 microseconds. The outputs of dual pulse width discriminator 46, which comprise either valid horizontal sync pulses or valid equalizer pulses, are coupled via an OR gate 47 to a sample pulse generator 49 and the input of 6 microsecond window control unit 45. Sample pulse generator 49 is a conventional pulse generator circuit which generates a 3 microseconds wide sample pulse for each pulse input thereto. The output of sample pulse generator 49, termed processed H, is coupled to input VCO circuit 27.

Six microsecond window control unit 45 is a conventional delayed pulse generator which generates a train of 6 microsecond wide pulses centered about the expected arrival time of incoming horizontal sync pulses. In addition, this unit is provided with an internal disable time-out circuit which is operative approximately 80 microseconds from the time of the last sample. Thus, if a horizontal sync pulse is not recognized by pulse width discriminator unit 46 within 80 microseconds from the last pulse so recognized, 6 microsecond window control unit 45 is automatically disabled until the next pulse is recognized.

Figure 4:
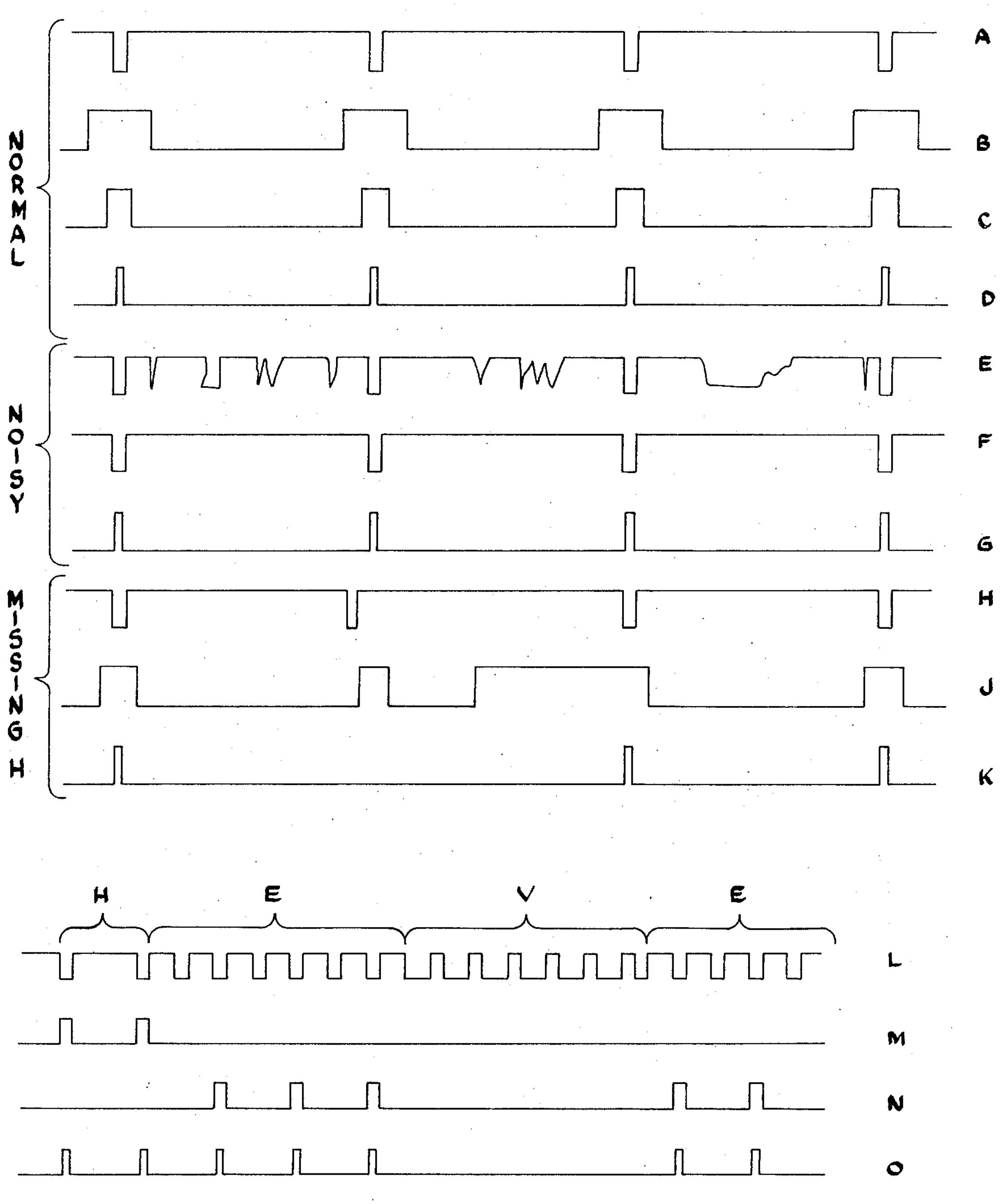
FIG. 4 is a waveform diagram illustrating the operation of the sync processor of FIG. 3.

Waveforms A–D of FIG. 4 illustrate the operation of sync processor 26 when noiseless horizontal sync pulses are received at substantially constant repetition intervals from sync stripper 24. Under such conditions, each incoming sync pulse shown in waveform A lies within both the 15 microsecond window provided by RAMP signal (waveform B) and the 6 microsecond window provided by unit 45 (waveform C). Thus, sample pulse generator 49 generates a 3 microseconds wide processed H pulse (waveform D) for each horizontal sync pulse received by sync processor 26.

Waveforms E–G illustrate the operation of sync processor 26 when noise is super-imposed on the incoming horizontal sync pulses, which condition is illustrated by waveform E. As illustrated by waveform F, which represents the output of AND gate 44, the 15 microsecond and 6 microsecond masks remove substantially all the noise present on the input to sync processor 26, with the exception of noise which, in combination with an adjacent horizontal sync pulse, lies within the 6 microsecond window. As illustrated by waveform G, such is eliminated by pulse width discriminator 46. Thus, the combined effect of sync processor 26 on noisy input sync information is the removal of all such noise and the generation of uniform width sample pulses corresponding to input horizontal sync pulses on a one-to-one basis.

Waveforms H, J, K illustrate the operation of sync processor 27 whenever a horizontal sync pulse is missing or is displaced to such an extent that it lies outside the 6 microsecond wide window provided by control unit 45. In waveform H illustrating the incoming horizontal sync pulses, the second pulse occurs outside the 6 microsecond window edge. Since this pulse lies without the smaller window boundary, it is not detected by discriminator 46 and no sample pulse is generated corresponding thereto (waveform K). As shown by waveform J, failure of discriminator 46 to detect a valid pulse causes the 6 microsecond mask to be removed approximately 80 microseconds after the previous sample so that the next succeding horizontal sync pulse must only meet the criterion of the 15 microsecond window. As shown in waveform K, the resultant effect is a train of sample pulses from pulse generator 49 which omits the displaced horizontal sync pulse.

Waveforms L illustrate the operation of sync processor 27 in response to the receipt of horizontal sync pulses, equalizer pulses and vertical sync pulses. In waveform L a train of pulses is illustrated which comprises horizontal sync pulses H, equalizer pulses E and vertical sync pulses V. For economy of space, the time scale of waveforms L–0 is greatly compressed. Waveform M illustrates the output of discriminator 46 in response to the receipt of successive horizontal sync pulses. Waveform N illustrates the output of discriminator 46 in response to the receipt of successive equalizer pulses. It is noted that discriminator 46 detects only those alternate equalizer pulses which occur with substantially the same frequency as the horizontal sync pulses. Waveform 0 illustrates the output of sample pulse generator 49 in response to the receipt of waveforms M and N. It is noted that processed H, the output of sample pulse generator 49, comprises pulses of uniform width generated in response to both horizontal sync pulses and equalizer pulses. It is further noted that vertical sync pulses are screened out by sync processor 26.

INPUT VCO CIRCUIT

FIG. 5 illustrates input VCO circuit 27 which generates $3f$ sample and store signals at a frequency which compensates for the time base errors in processed H and input color burst. A voltage controlled oscillator 50 generates a high frequency periodic signal train at a multiple of $f_c'$ the standard color burst frequency (3.58 MHZ). In the preferred embodiment, the frequency of this singal train is $12f_c$. The output of voltage controlled oscillator 50 is coupled to the input of a conventional divider circuit 51 which in the preferred embodiment comprises three 74161 type counters coupled in tandem. Divider 51 is tapped at a plurality of outputs to generate a variety of reference signals. The first output, labeled 3 *f*, provides the sample signals for analog-to-digital converter 23 and the write clock signals for sequence control unit 28. Another output, labeled *f*, provides a high frequency reference signal to a first input of a phase comparator 57 for a purpose to be described. The remaining output, labeled VCO 2H, is coupled directly to a first input of an AND gate 54 and through a conventional divide-by-2 circuit 53 to the other input of AND gate 54. The output of AND gate 54, termed RAMP, is coupled to an input of a phase comparator 56 and also to AND gate 41 of sync processor 26 (FIG. 3).

Incoming processed H signals are coupled to the input of a gate generator 55. Gate generator 55 provides a gating signal for a diode switch 60 and an integrator 61. In the preferred embodiment, gate generator 55 comprises a monostable multivibrator having a period substantially equal to the duration of the color burst portion of a line of video information, i.e., approximately 2.3 microseconds.

As noted above, RAMP signal is coupled to a first input of phase comparator 56. The remaining input to phase comparator 56 is processed H from the output of sync processor 26. Phase comparator 56 is a conventional phase comparator circuit which provides a DC correction voltage whose magnitude varies with the phase difference between the two input signals. In addition, phase comparator 56 is provided with an internal sample and hold circuit which retains the correction voltage between successive phase comparisons (i.e., in the period between successively received processed H pulses). The output of phase comparator 56 is coupled to a first input of a summing amplifier 58, the output of which is coupled to a second summing amplifier 59.

As noted above, *f* signal is coupled to a first input of phase comparator 47. The remaining input to phase comparator 57 comprises the input video color burst signal received from burst separator 25. Phase comparator 57 is similar to phase comparator 56 and provides a DC correction voltage whose magnitude varies in accordance with the phase difference between the two input signals. In addition, phase comparator 57 is also provided with an internal sample and hold circuit for retaining this control voltage between successive phase comparisons. The output of phase comparator 57 is coupled to a diode switch 60 and also to an integrator 61.

Diode switch 60 is preferably a four diode bridge with a switching input which is controlled by the gate signal obtained from gate generator 55 so that the output of phase comparator 57 is coupled to the second input of summing amplifier 59 only during the burst portion of a line of video information.

Integrator 61 is a conventional gated integrator having a gate input controlled in a manner similar to diode switch 60 by the gate signal obtained from gate generator 55 so that the output of phase comparator 57 is coupled to integrator 61 also only during the color burst portion of successive lines of video information. The output of integrator 61 is coupled to a second input of summing amplifier 58. Both diode bridge 60 and integrator 61 are provided with disable inputs controlled by the disable signal obtained from the above-noted threshold circuitry of burst separator 25 which disables diode switch 60 and integrator 61 whenever the color portion of the incoming video information lies below a predetermined threshold level.

A calibrating potentiometer 62 is coupled to a pair of reference voltages +V, −V, respectively, and to a third input to summing amplifier 58 as shown.

In operation, in the absence of any time base error in the incoming video signal voltage controlled oscillator 50 generates a 12 $f_c$ signal train. The 12 $f_c$ signal train is divided down by divider 51 to produce the 3 $f_c$ (i.e., 10.7 MHZ) sample and store signals, f phase reference signals at the rate of 3.58 MHZ to phase comparator 57 and VCO 2H reference signals at the rate of 31.47 KHZ. The VCO 2H reference signals are processed by divide-by-2 circuit 53 and AND gate 54 to produce the RAMP signal which comprises a 15 microseconds wide square wave train centered about the expected arrival time of successive horizontal sync pulses. Calibration of the input VCO unit is achieved empirically by injecting a standard video test pattern into the system and adjusting potentiometer 62 while observing the video output of the unit on a suitable test instrument (e.g. an oscilloscope) until the horizontal sync portion of the video output appears in standard form. Once adjusted, the properly phased RAMP signal serves as a reference input to phase comparator 56. In the absence of any time base errors in the incoming video signal, neither phase comparator 56 nor phase comparator 57 produces a correction voltage, and voltage controlled oscillator 50 continues to generate the signal train at 12 $f_c$.

If the incoming video signal contains time base errors, the phase difference between processed H and RAMP signals causes phase comparator 56 to produce a first correction voltage which is coupled by summing amplifiers 58 and 59 to the control voltage input of voltage controlled oscillator 50. In addition, any phase difference between the color burst input signal and the *f* reference from divider 51 causes phase comparator 57 to produce a correction voltage at the output thereof which is coupled during the burst portion of that horizontal line to integrator 61 and through diode switch 60 to voltage controlled oscillator 50 via summing amplifier 59. It will be remembered that the operation of diode switch 60 and integrator 61 is controlled both by the gate signal from gate generator 55 and the disable signal from burst separator 25. Thus, if the color portion of the input video signal lies below a predetermined threshold, or if there is no color component (i.e., the input video signal is monochromatic), the disable signal applied to diode switch 60 and integrator 61 disables these elements. In the absence of a disable signal, the correction voltage resulting from phase differences in the color portion of the signal is coupled directly to the control voltage input of voltage controlled oscillator 50 and is also integrated over a period of several lines by integrator 61.

Receipt of the control voltage by voltage controlled oscillator 50 causes the frequency of the output to shift from 12 $f_c$ to a different frequency in order to compensate for the detected phase differences. This change in frequency of the output of voltage controlled oscillator 50 is reflected in the various output signals from divider 51.

As will now be apparent, input VCO circuit 27 provides two phase correction loops for adjusting the frequency of input VCO 50. The first, or H, loop provides a coarse correction voltage which compensates for large time base errors. The second, or *f*, loop provides a fine correction voltage which compensates for small time base errors. In addition, the *f* loop integrator 61 provides a time averaged correction voltage, averaged over several lines of video, which compensates for random 180° color phase lock errors.

ANALOG-TO-DIGITAL CONVERTER

Analog-to-digital converter 23, shown in FIG. 6, is a parallel-serial converter which converts each sampled portion of the incoming analog video information into an 8-bit Grey code digital character. Each sampled portion is converted to a digital character in two 4-bit parallel conversions which occur serially. Incoming video signals from DC restore unit 22 are coupled to the sample input of a sample and hold circuit 65. The analog video input signals are sampled at the rate 3 *f* in response to the receipt of each sample pulse from input VCO circuit 27. In the preferred embodiment, sample and hold circuit 65 is a conventional circuit having an acquisition time of approximately 20 nanoseconds and a settling time of approximately 20 nanoseconds. Each sample is retained in sample and hold circuit 65 for the entire duration of a sample period, i.e., 93 nanoseconds.

The output of sample and hold circuit 65 is coupled to a first compare input of a plurality of coarse comparators $66_1 - 66_{15}$. Comparators $66_1 - 66_{15}$ each comprise a dual input comparator having an internal latch operated by a strobe signal, preferably a type 685 comparator available from Advanced Microdevices, Inc. of Sunnyvale, California. The remaining compare input to each one of coarse comparators $66_1 - 66_{15}$ is a voltage level reference signal obtained from a coarse reference voltage supply 68 and a voltage dividing network comprising a plurality of resistors $70_1$–$7_{15}$. Coarse reference voltage supply 68 and resistors $70_1 - 70_{15}$ provide voltage reference levels of descending magnitude to comparators $66_1 - 66_{15}$ in 15 unit increments. Thus, coarse comparators $66_1 - 66_{15}$ provide a first coarse conversion of the sample.

The outputs of comparators $66_1 - 66_{15}$ are coupled to a conventional encoder 71 which provides a Grey encoded output along a bus 72 specifying the four most significant bits of the 8-bit digital character for a given sample to a buffer register 75. the complementary outputs of comparators $66_1 - 66_{15}$ are coupled to a digital-to-analog converter 76 which reconverts this digital value to an inverse analog form representing a negative value. This analog signal is coupled to a first input of a summing network 78. The remaining input to summing network 78 is the stored sample obtained from sample and hold circuit 65.

The output of summing network 78 is coupled through a unit gain amplifier 79 to the first compare input of a plurality of fine comparators $80_1 - 80_{15}$. The remaining compare input to fine comparators $80_1 - 80_{15}$ is a fine reference voltage generated by a voltage divider network comprising a plurality of resistors $82_1 - 82_{16}$. The reference voltage for this voltage dividing network is obtained from the reference voltage compare input of the last coarse comparator $66_{15}$, coupled through unit gain amplifier 83. The outputs of fine converters $80_1 - 80_{15}$ are coupled to a second Grey encoder 84 along with the carry bit from encoder 71 bia lead 73 required to generate a true Grey code. The output of encoder 84, which specifies the four least significant bits of the digital character representing the sample, is coupled by a bus 85 to buffer register 75.

A coarse strobe generator 87, which is triggered by a sample signal, provides a strobe signal for enabling coarse comparators $66_1 - 66_{15}$. In the preferred embodiment, coarse strobe generator 87 provides a 5 nanoseconds wide pulse approximately 20 nanoseconds after acquisition of a sample by sample and hold circuit 65.

The output of coarse strobe generator 87 is also coupled to a fine strobe generator 88, similar to coarse strobe generator 87, which generates a strobe pulse for fine converters $80_1 - 80_{15}$. In the preferred embodiment, fine strobe generator 88 produces a 5 nanoseconds wide pulse approximtely 43 nanoseconds after receipt of an input pulse from coarse strobe generator 87.

The output of fine strobe generator 88 is also coupled to a buffer strobe generator 89. In the preferred embodiment, buffer strobe generator 80 produces a 5 nanoseconds wide pulse approximately 10 nanoseconds after receipt of an input pulse from fine strobe generator 88. Strobe generators 87, 88 and 89 are preferably monostable multi-vibrators having appropriate time-out periods and conventional pulse generating circuitry for providing 5 nanosecond wide strobe pulses.

In operation, in response to the receipt of a sample pulse, sample and hold circuit 65 stores the analog signal present at the input thereto and couples this value to the firsts compare inputs of coarse comparators $66_1 - 66_{15}$. After a lapse of 20 nanoseconds after sample acquisition, coarse strobe generator 87 strobes coarse comparators $66_1 - 66_{15}$. Comparators $66_1 - 66_{15}$ remain latched until the end of the sample period.

The outputs of coarse comparators $66_1 - 66_{15}$ are encoded by encoder 71 to the four most significant bits of the Grey code digital character representing the sample and are coupled to buffer register 75. The complimentary outputs of coarse comparators $66_1 - 66_{15}$ are converted by digital-to-analog converter 76 back to analog form and subtracted from the stored sample by summing network 78. The algebraic difference signal is coupled via amplifier 79 to the first compare input of fine comparators $80_1 - 80_{15}$. After a lapse of approximately 43 nanoseconds from the generation of the coarse strobe signal, fine strobe generator 88 produces a strobe signal which latches fine comparators $80_1 - 80_{15}$. Fine comparators $80_1 - 80_{15}$ remain latched until the end of the sample period.

The outputs of fine comparators $80_1 - 80_{15}$ are encoded by encoder 84 to the four least significant bits of the Grey code digital character representing the sample and are coupled via bus 85 to buffer register 75. After a lapse of approximately 10 nanoseconds from the generation of the fine strobe pulse, buffer strobe generator 89 produces a strobe pulse which enables the complete 8-bit digital character to be stored in buffer register 75. Upon receipt of the next sample pulse, a new sample is stored in sample and hold circuit 65 and operation proceeds as described supra.

SEQUENCE CONTROL UNIT

Figure 7:
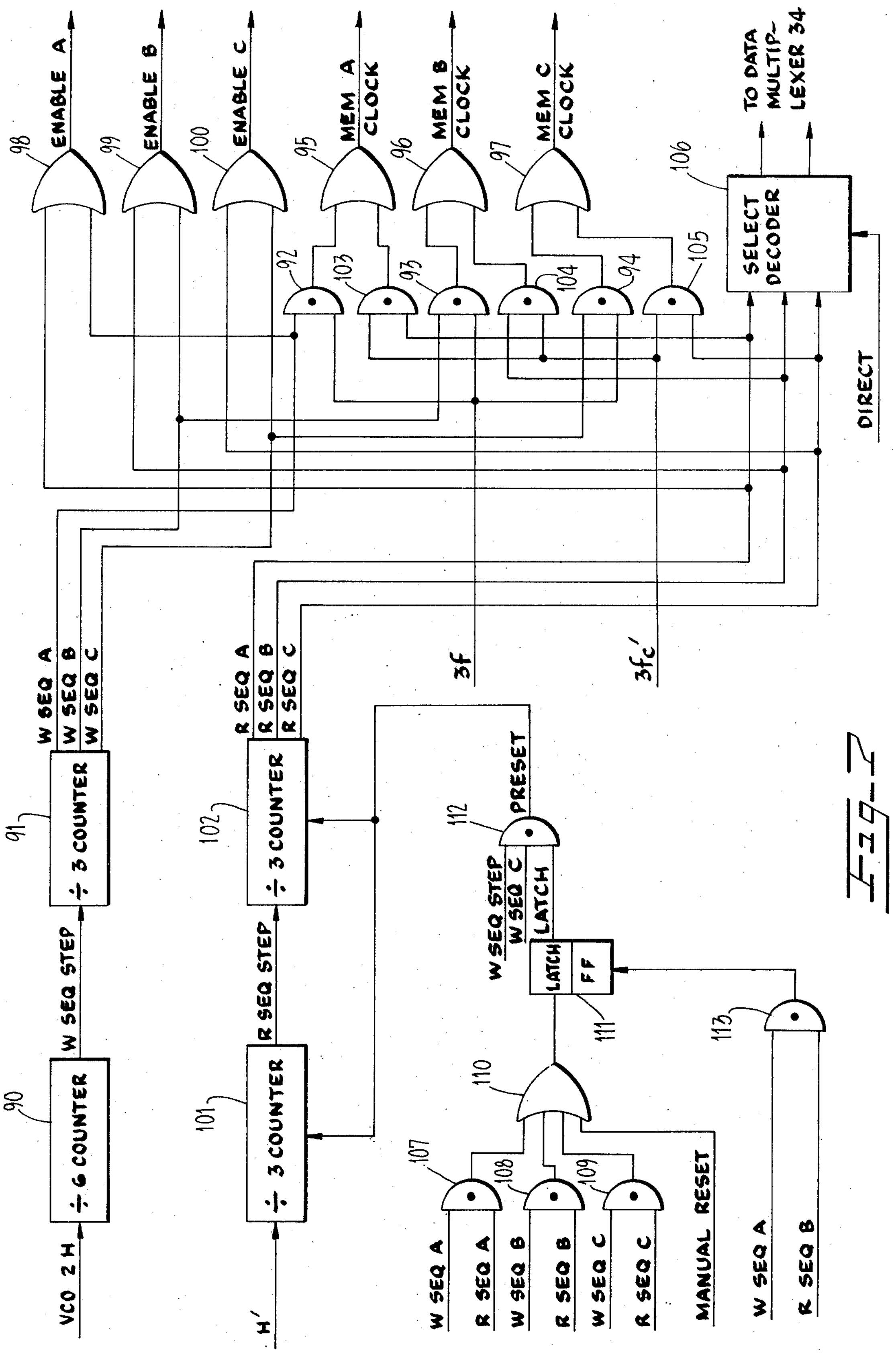
FIG. 7 is a schematic diagram illustrating the sequence control unit of the preferred embodiment.

Sequence control unit 28 is illustrated in FIG. 7. VCO 2H pulses are coupled to the input of a conventional divide-by-six counter 90 which generates a pulse termed W SEQ STEP for each three lines of video information. Successive W SEQ STEP pulses are coupled to a conventional divide-by-three counter 91. The three stages of divide-by-three counter 91 are tapped to provide three enabling signals termed W SEQ A, W SEQ B, and W SEQ C. These three signals are each coupled to a different first input of three separate AND gates 92–94. The other inputs to each of AND gates 92–94 is a $3f$ signal obtained from input VCO circuit 27. The outputs of AND gates 92–94 are coupled through three separate OR gates 95, 96, 97 to the clock inputs of memory units 30–32 respectively. W SEQ A, W SEQ B and W SEQ C signals are also coupled to a first input of a different one of three OR gates 98–100, respectively, the outputs of which provide the ENABLE A, ENABLE B and ENABLE C control signals for memory units 30–32.

H′ pulse signals from switching network 36 are coupled to the input of a conventional divide-by-three counter 101 which produces an output signal pulse for each third horizontal line of video information, termed R SEQ STEP. The R SEQ STEP pulses are coupled to the input of a conventional divide-by-three counter 102. The three stages of divide-by-three counter 102 are tapped to provide three enabling signals termed R SEQ A, R SEQ B and R SEQ C. These three outputs are coupled to a different first input of three separate AND gates 103–105. The remaining input to AND gates 103–105 is $3f_c$ signal obtained from output VCO circuit 33. The output of AND gates 103–105 are coupled through OR gates 95–97 to the clock inputs of memory units 30–32, respectively. R SEQ A, R SEQ B and R SEQ C signals are also coupled to the second input of a different one of OR gates 98–100, respectively.

R SEQ A, R SEQ B and R SEQ C signals are further coupled to a select decoder 106 which provides a 2-bit digital character to data multiplexer 37 for specifying the coupling of one of memory units 30–32 to data multiplexer 37, or the direct analog-to-digital converter 23 to data multiplexer 37 path. This direct path is provided to enable the digitized video to by-pass the time base error correcting store-fetch portion of the system for comparison purposes and is selected by the generation of a DIRECT signal by an operator accessible control (not shown).

Figure 8:
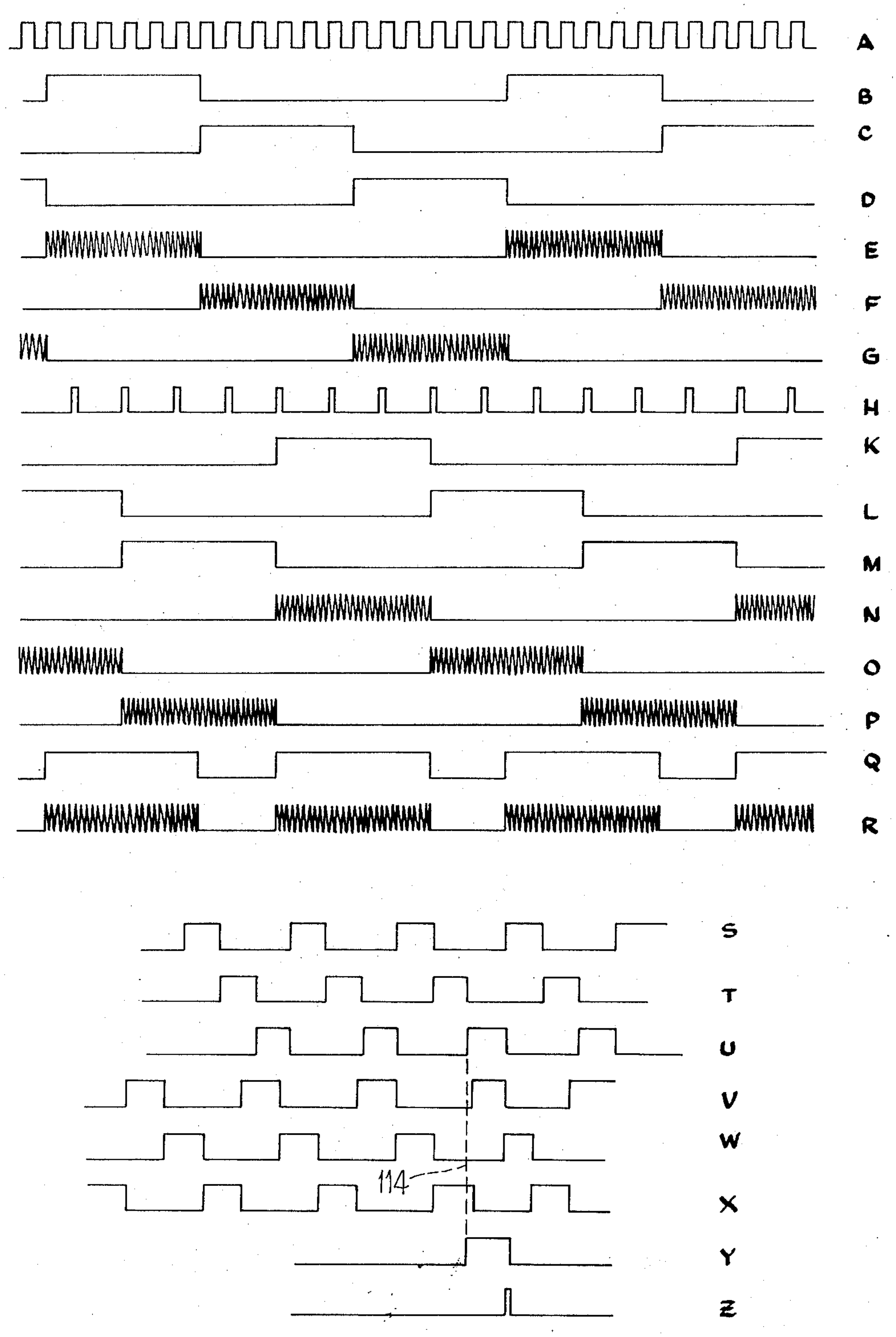
FIG. 8 is a waveform diagram illustrating the operation of the sequence control unit of FIG. 7.

FIG. 8 illustrates various waveforms useful in understanding the operation of sequence control unit 28. For purposes of clarity waveform A, which illustrates VCO 2H signal from input VCO circuit 27, is represented as a constant frequency signal, i.e., a signal having no time-base error in frequency, but with a fixed phase error with respect to H′ signal from switching network 36, the latter signal being represented by waveform H.

With reference to FIGS. 7 and 8, in operation VCO 2H signals (waveform A) are divided down by counters 90 and 91 to sequentially generate the W SEQ A, W SEQ B and W SEQ C signals (waveforms B-D). These signals are coupled via OR gates 98–100 to sequentially enable a different one of memory units 30–32 for writing data therein. The $3f$ clock signals are coupled during any given write interval through one of AND gates 92–94 and OR gates 95–97 (waveforms E-G) to a selected one of memory units 30–32 in order to write successive lines of digital information from analog-to-digital converter 23 into the selected memory unit. After three lines have been written into a specified memory, the adjacent memory is specified by the output of counter 91 and the next three lines of information are written therein.

Contemporaneously with the write operation, counters 101 and 102 divide down the H′timing pulses (waveform H) and sequentially generate the R SEQ A, R SEQ B and R SEQ C signals (waveforms K–M). These signals are coupled via OR gates 98–100 to sequentially enable a different one of memory units 30–32 for fetching data therefrom. The $3f_c$ read clock signals are coupled during any given read interval through one of AND gates 103–105 and OR gates 95–97 (waveforms N–P) to a selected one of memory units 30–32. The combined ENABLE and clock signals coupled to memory unit 30 via OR gates 98, 95, respectively, are illustrated by waveforms Q and R. As shown, memory unit 30 is cyclically enabled for writing of data therein and fetching of data therefrom by the ENABLE signals (waveform Q) generated from successive W SEQ A and R SEQ A signals. When enabled, memory unit 30 is alternately clocked by $3f$ write clock signals and $3f_c$ read clock signals. As will be evident to those skilled in the art, the separate write and read clock signals are not mutually synchronous. Since the combined ENABLE and clock signals coupled to memory units 31 and 32 are substantially similar to the memory unit 30 ENABLE and clock signals, they are omitted from FIG. 8 to avoid prolixity.

Waveforms A–R illustrate the optimum condition in which the write sequence enable signals (waveforms B–D) are centered between the read sequence enable signals (waveforms K–M). When sequence control unit 28 is operating in this state, a maximum time base error of ± 1.5 lines between successive lines of video can be corrected by the invention.

The R SEQ A, R SEQ B and R SEQ C signals are also individually decoded by select decoder 104 to 2-bit SELECT signals for synchronizing the operation of data multiplexer 37 with the fetching of data from one of memory units 30–32. For economy of space, the SELECT signals are omitted from FIG. 8.

The above described contemporaneous write-read operation proceeds as described unless the time-base errors exceed the maximum correctable deviation, which results in the generation of overlapping write enable and read enable signals for a single memory unit. When this condition obtains, in order to remedy double clocking of the memory unit by the separate write and read clocks, a special preset circuit presets the operation of sequence control unit 28 in the following fashion. The individual W SEQ A, W SEQ B, W SEQ C and R SEQ A, R SEQ B and R SEQ C outputs from counters 91 and 102 are paired at the inputs to individual AND gates 107–109. The outputs of AND gates 107–109 are coupled via an OR gate 110 to the input of a latch flip-flop 111, along with a manual reset signal obtained from an operator accessible manual switch (not shown). The output of latch flip-flop 111 is coupled to one input of an AND gate 112 along with W SEQ STEP and W SEQ C signal lines. The output of AND gate 112 is coupled to the preset inputs of counters 101, 102. W SEQ A and R SEQ B signals are coupled via AND gate 113 to the reset input of latch flip-flop 109.

In operation, whenever any pair of write and read enable signals are present at the input of one of AND gates 105, 107, indicating an invalid attempt to read and write contemporaneously from the same memory unit, the output from that AND gate sets latch flip-flop 111. When latch flip-flop 111 is set, latch signal appears at one input to AND gate 112 thereby conditioning this element. Upon termination of the next W SEQ C signal, which immediately preceeds the generation of W SEQ A signal, AND gate 112 generates a preset signal which presets counters 100, 102 to a combined count representing one third of the total length of the R SEQ B interval.

Waveforms S–Z illustrate the operation of the preset circuit in response to overlap between W SEQ C and R SEQ C write and read enable signals. As illustrated in this Figure, W SEQ A, W SEQ B and W SEQ C write enable signals are represented by waveforms S–U. R SEQ A, R SEQ B and R SEQ C read enable signals are represented by waveforms V–X. For illustrative purposes, the write enable signals are all depicted as having a uniform period which is approximately 10 percent shorter than the uniformly depicted period of the read enable intervals. Thus as operation of the sequence control unit proceeds, the phase difference between the write enable intervals and the read intervals accumulates until the W SEQ C write enable signal overlaps with the R SEQ C read enable signal at the point indicated by lead line 114. When this overlapping condition obtains, latch flip-flop 111 is set by the output of AND gate 109 via OR gate 110, thereby conditioning AND gate 112. The output of latch flip-flop 111 is represented in FIG. 8 by waveform Y. Thereafter, at the end of the W SEQ C write enable interval, AND gate 112 generates a preset pulse represented by waveform Z thereby presetting counters 101, 102 to the above-noted advanced count. This results in the discarding of one half of one line of video information contained in the last one-third portion of memory unit 30 and a single line of video information contained in the first one-third portion of memory unit 31 but the visual effect of discarding this information is so negligible as to be unnoticeable for viewing purposes. As noted, latch flip-flop 111 is subsequently reset by the concurrence of W SEQ A and R SEQ B, thereby re-arming the preset circuit for detection of a subsequent overlapping condition.

DATA MULTIPLEXER

Data multiplexer 37 is shown in FIG. 9. The individual data inputs from memory units 30–32 and the direct data input from analog-to-digital converter 23 are coupled to the separate data inputs of a switching network 115, which in the preferred embodiment is an 8-pole, four position electronic switch controlled by the select input signals obtained from sequence control unit 28. Data transferred through switching network 115 is coupled via a data bus 116 to the input of a code converter 117. Code converter 117 is a conventional device for converting 8-bit Grey code digital characters to 8-bit binary characters. The output of code converter 117 is coupled via data bus 118 to the input of a deskewing register 119, which in the preferred embodiment comprises 8 flip-flops. Deskewing register 119 removes any skew between the 8 digital character bits introduced during the fetch operation. In addition, composite blanking signals from switching network 36 are inserted into the digital information flowing through deskewing register 119 in order to remove any noise pulses introduced upstream of the data by the various switching elements and also to remove the composite sync and color burst from each line of video information flowing through deskewing register 119 in digital form. Digital characters are clocked out from deskewing register 119 to digital-to-analog converter 38 with $3f'_c$ clocking signals obtained from output VCO circuit 33.

OUTPUT VCO CIRCUIT

Figure 10:
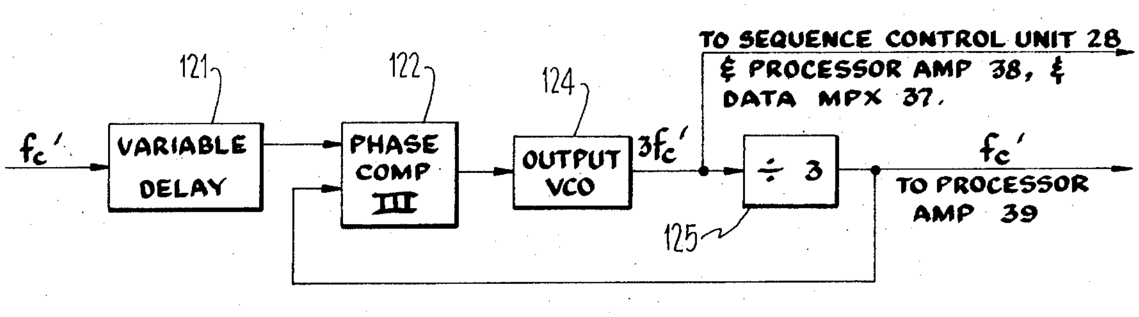
FIG. 10 illustrates the output VCO circuit of the preferred embodiment.

Output VCO circuit is shown in FIG. 10. The $f'_c$ color reference signals from switching network 36 are coupled to a variable delay unit 121 which compensates for any phase errors introduced into $f'_c$ signals by various connecting cables and other circuit elements. The output of variable delay 121 is coupled to a conventional phase comparator 122. The output of phase comparator 122 is coupled to an output Voltage Controlled Oscillator 124 which provides a periodic signal train output at a freqnency $3f'_c$. As noted above, the $3f'_c$ clock train is coupled to sequence control unit 28, to data multiplexer 37, and to processor amplifier 39, as a reference clock frequency. The $3f'_c$ clock reference signal is also divided down by a conventional divide-by-three counter 125 and coupled to processor amplifier 39 for a purpose to be described. The output of divide-by-three counter 125 is also coupled to the remaining input of phase comparator 122 in order to lock output VCO 124 to the color reference frequency standard $f'_c$.

PROCESSOR AMPLIFIER

Figure 11:
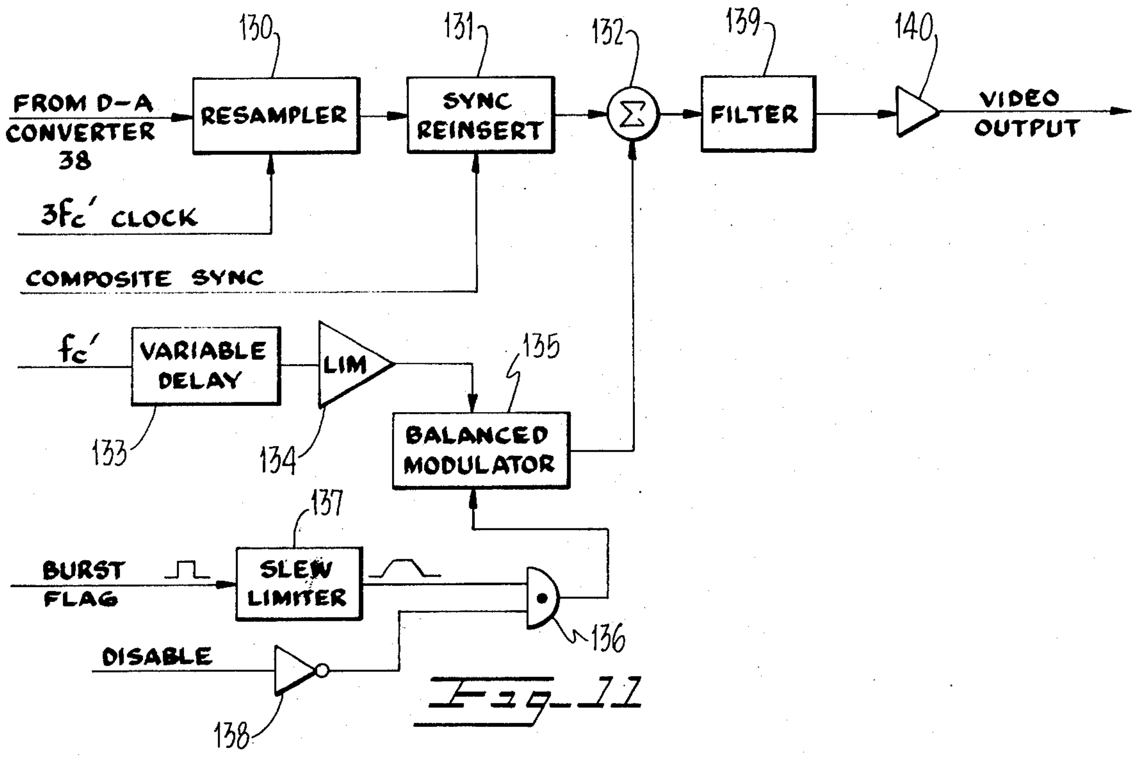
FIG. 11 illustrates the processor amp of the preferred embodiment.

Processor amplifier 39 is illustrated in FIG. 11. Output signals from digital-to-analog converter 38 are coupled to a conventional resampler unit 130. Resampler 130 is a conventional sample and hold circuit sampled by $3f'_c$ clock signals for eliminating any variable delay introduced into the 8-bit digital characters by digital-to-analog converter 38. The output of resampler 130 is coupled to the input of a sync reinsertion circuit 131 which in the preferred embodiment is a series/shunt analog switch for inserting composite sync signals obtained from switching network 36 at appropriate portions of each line of video information. The output of sync re-insertion circuit 131 is coupled to a first input of a summing network 132.

The $f'_c$ color reference signals from switching network 36 are coupled through a variable delay unit 133 and a limiter 134 to one input of a conventional balanced modulator 135. Variable delay unit 133 enables proper phase adjustment of $f_c'$ prior to combination with a slewed burst flag in modulator 135. The remaining input to balanced modulator 134 is the output of an AND gate 136. Coupled to a first input of AND gate 136 is the output of a slew limiter circuit 137 which generates a slewed burst flag signal having sloping leading and trailing edges from burst flag signals obtained from switching newtork 36. The remaining input to AND gate 136 is the above-noted DISABLE signal from burst separator 25, inverted by an inverter 138. Thus, whevever a frame of color video information having a predetermined threshold strength is being received, the slewed burst flag from slew limiter circuit 137 is coupled to the remaining input of modulator 135. The output of balanced modulator 135, which comprises properly phased synthetic color burst, is coupled to the remaining input of summing network 132. The output of summing network 132 is passed through a filter 139, which in the preferred embodiment is a 7-pole low pass Butterworth filter having a 6

MHZ 3 db corner frequency. The output of filter 139 is coupled to the input of a video amplifier 140 which yields one volt peak-to-peak video. The amplified analog time base corrected video signals from video amplifier 140 are then coupled to appropriate follow on circuitry, such as a television monitor, a broadcast device, or the like.

In operation, systems constructed according to the invention provide an extraordinarily wide maximum correction window of ± 1.5 lines of video information, (i.e., ± 95.34 microseconds), and furnish composite video output signals having a maximum time-base error of less than ± 4 nanoseconds. As will be evident to those skilled in the art, this time-base correction capability is many times greater than comparable known devices. Moreover, the invention is not limited in application to any particular video tape recorder now available, but may be used in conjunction with any capstan servo video tape recorder or other servo type source to remove time-base errors contained in the video signals supplied thereby. In this connection, the sync generator internal to the invention may be used as the source of sync and timing signals for the servo device. Further, systems constructed accorcing to the invention achieve total phase lock within a period of two seconds, as compared to a maximum of 6 seconds of known comparable devices. In addition, because the invention provides broadcast quality composite video at the output from sub-standard composite video at the input, extremely inexpensive video tape recorders and other comparable low cost sources of video signals may now be used as a source of program material for broadcast purposes.

While the above provides a full and complete disclosure of the preferred embodiment various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for removing time base errors from video type information signals comprising:

input means adapted to be coupled to said information signals;

an input clock generator coupled to said input means for generating input clock reference signals having a variable rate dependent upon said time base errors in said information signals;

means for sampling said information signals at a rate determined by said input clock reference signals, said sampling means having a control input coupled to said input clock generator;

memory means coupled to said sampling means for temporarily storing said sampled signals at a rate determined by said input clock reference signals;

an output clock generator for generating output clock reference signals having a standard rate;

sequencer means for controlling the application of said input and said output clock reference signals to said memory means to sequentially store said sampled signals at said variable rate and fetch said store signals at said standard rate; and output means coupled to said memory means.

2. The system of claim 1 wherein said sampling means includes means for converting said information signals to digital form, and said output means includes means for converting said digital signals to analog form after storage in said memory means.

3. The system of claim 1 wherein said input means includes separator means for coupling the sync and burst portions of said information signals to said input clock generator.

4. The system of claim 3 wherein said separator means includes a sync stripper for supplying said sync portions at the output thereof, and sync processor means coupled to the output of sync stripper for providing output pulses of substantially uniform width at the output thereof in response to the horizontal sync and equalizer pulse portions of said information signals.

5. The system of claim 4 wherein said sync processing means includes dual pulse discriminator responsive to pulses having a duration substantially equal to the duration of standard horizontal sync and equalizer pulses for enabling the generation of said output pulses whenever a pulse having either of said standard durations appears at the input thereto.

6. The system of claim 4 wherein said sync processing means includes a first window gating means for transmitting therethrough pulse signals occurring within a first predetermined arrival time range substantially centered about the mean arrival time of a previous one of said pulse signals.

7. The system of claim 6 further including second window generating means for transmitting therethrough pulse signals occurring within a second arrival time range substantially centered within said first arrival time range.

8. The system of claim 7 further including means for disabling said second window generating means after a predetermined time period in the absence of the receipt of a subsequent pulse within said second arrival time range.

9. The system of claim 3 wherein said separator means includes a burst separator for supplying said burst portion at the output thereof, and means for generating a disable signal for disabling a portion of said input clock generator in the absence of a burst portion of a predetermined threshold value.

10. The system of claim 1 wherein said input clock generator includes control signal generating means for generating a control signal having a magnitude dependent upon the phase difference between a reference signal train and a predetermined portion of said information signals, and generator means having a control signal input coupled to said control signal generator means for generating a reference signal train having a frequency dependent upon the magnitude of said control signal.

11. The system of claim 10 wherein said generator means includes first means for generating a first reference signal train having a frequency substantially equal to the repetition rate of the previously received one of the horizontal sync and equalizer pulse portions of said information signal, and said control signal generating means includes a first comparator means for generating a first control signal having a magnitude dependent upon the phase difference between said first reference signal train and a subsequently received one of said horizontal sync and equalizer pulse portions of said information signal.

12. The system of claim 11 wherein said generator means includes second means for generating a second reference signal train having a predetermined frequency substantially equal to the frequency of the previously received burst portion of said information signal, and said control signal generator means includes a second comparator means for generating a second control signal having a magnitude dependent upon the phase difference between said second reference signal train and a subsequently received burst portion of said information signal.

13. The system of claim 12 wherein said control signal generator means further includes gating means for transmitting the output of said second comparator means to said control signal input, of said generator means, and means for enabling said gating means during the burst portion of said information signal.

14. The system of claim 13 further including means for disabling said gating means whenever the magnitude of said subsequently received burst portion lies below a predetermined threshold.

15. The system of claim 12 wherein said control signal generating means further includes gated integrator means for integrating the output of said second comparator means over several lines of said information signal, said integrator being coupled to said control signal input of said generator means, and means for enabling said gated integrator means during the burst portion of each of said several lines.

16. The system of claim 15 further including means for disabling said gated integrator means whenever the magnitude of said subsequently received burst portion lies below a predetermined threshold.

17. The system of claim 2 wherein said converting means comprises a analog-to-digital converter for digitizing said information signals at said variable rate.

18. The system of claim 1 wherein said memory means comprises a plurality of memory units each having an enable and a clock input, and said sequencer means includes means for sequentially enabling said memory units for storing said sampled signals therein at said variable rate and fetching said sampled signals therefrom at said standard rate.

19. The system of claim 18 wherein said sequencer means includes means for detecting an overlap condition in which both variable and standard rate clock signals are contemporaneously coupled to an enabled memory unit, and preset means responsive to the sensing of said overlap condition by said detecting means for enabling different ones of said memory units for storing and fetching respectively.

20. The system of claim 19 wherein said preset means includes means for enabling one of said memory units for fetching at a predetermined intermediate portion thereof in response to said overlap condition.

21. The system of claim 1 wherein said output clock generator includes means for generating output clock reference signals at a frequency of M/N $f_{c'}$ , where $f'_c$ is the color burst frequency standard and M and N are integers.

22. The system of claim 21 wherein M/N = 3.

23. The system of claim 2 wherein said output means includes a digital-to-analog converter, a processor amplifier coupled to said digital-to-analog converter and means having a plurality of inputs adapted to be coupled to a sync generator for transferring $f_c$ standard color reference signals to said output clock generator, standard horizontal sync pulses to said sequencer means, standard composite blanking and burst gate signals and saandard composite sync pulses to said processor amplifier; said standard $f_{c'}$ , composite blanking and burst gate signals and composite sync pulses being furnished by said sync generator.

24. The system of claim 23 further including an oscillator for generating a reference signal train having a frequency of M/N $f_{c'}$; where $f_c$ is the color burst frequency standard and M and N are integers, and a sync generator coupled to said oscillator for generating said standard $f_{c'}$ composite blanking and burst gate signals and composite sync pulses, the outputs of said sync generator being coupled to a first group of said plurality of inputs of said transferring means.

25. The system of claim 24 wherein said transferring means includes a second group of said plurality of inputs adapted to be coupled to a remote sync generator and means for enabling transfer of said standard signals and pulses from one of the two sync generators to the several elements recited in claim 23.

26. A method of applying time base corrections to video type signals having time base errors, said method comprising the steps of:

a. generating a first clock signal train having a variable rate in accordance with said time base errors;
b. generating a second clock signal train having a fixed rate;
c. sampling said video signals at intervals defined by one of said first and second clock signal trains;
d. temporarily storing said sampled signals at said intervals defined by said one of said first and said second clock signal trains; and
e. fetching said stored signals at intervals defined by the other of said first and second clock signal trains.

27. The method of claim 26 wherein said step (c) of sampling includes the step of converting said video signals to digital form, and further including the step of (f) reconverting said fetched signals to analog form.

28. The method of claim 26 wherein said store intervals are defined by said first clock signal train and said fetch intervals are defined by said second clock signal train.

29. The method of claim 26 wherein said step of generating a first clock signal train includes the steps of:

i. generating a reference signal train at a predetermined frequency;
ii. comparing the phase of said reference signal train to predetermined portions of said video type signals;
iii. generating a control signal indicative of phase differences between said reference signal train and said predetermined portions;
iv. altering said variable rate of said first clock signal train and said predetermined frequency of said reference signal train to compensate for said phase differences.

30. The method of claim 26 wherein said step of generating a first clock signal train includes the step of:

i. generating a first reference signal train having a first predetermined frequency;
ii. comparing the phase of said first reference signal train with horizontal sync and alternate equalizer pulse portions of said video type signals;
iii. producing a first control signal indicative of the phase difference between said first reference signal train and successive ones of said horizontal sync and alternate equalizer pulse portions; and iv. altering said variable rate of said first clock signal train and said first predetermined frequency in accordance with said control signals to compensate for said phase differences.

31. The method of claim 30 further including the step of screening out subsequently received ones of said pulse portions occurring outside a first predetermined arrival time interval centered about the mean arrival time of a previously received one of said pulse portions before performing said step of comparing.

32. The method of claim 31 further including the step of screening out subsequently received ones of said pulse portions occurring outside a second predetermined arrival time interval smaller than said first predetermined arrival time interval and centered about the mean of said first predetermined arrival time interval before performing said step of comparing.

33. The method of claim 32 further including the step of deleting said screening step in the absence of receipt of a subsequent one of said pulse portions within a predetermined period after receipt of a previous one of said pulse portions.

34. The method of claim 30 wherein said step of generating a first clock signal train further includes the steps of:

v. generating a second reference signal train having a second predetermined frequency;

vi. comparing the phase of said second reference signal train with burst portions of said video type signals;

vii. producing a second control signal indicative of the phase difference between said second reference signal train and successive ones of said burst portions; and viii. altering said variable rate of said first clock signal train and said second predetermined frequency in accordance with said second control signal to compensate for said phase differences.

35. The method of claim 34 further including the step of utilizing said second control signal for said step (viii) of altering during burst portions of said video type signals only.

36. The method of claim 34 further including the step of integrating successive ones of second control signals to produce a third control signal indicative of random color phase lock errors, and altering the frequency of said first clock signal train in accordance with said third control signal to compensate for said random color phase lock errors.

37. The method of claim 34 further including the step of omitting said step (viii) of altering when said burst portion lies below a predetermined threshold.

38. The method of claim 28 wherein said step of sampling includes the step of sampling said video type signals at said variable rate provided by said first clock signal train.

39. The method of claim 26 wherein said step of generating a second clock signal train comprises the step of generating a reference signal train having a frequency M/N $f_{cv}$, where $f_c$ is the color burst frequency standard and M and N are integers.

40. The method of claim 39 wherein M/N = 3.

41. The method of claim 27 wherein said step of reconverting includes the steps of:

i. performing a digital-to-analog conversion of said digital signals;

ii. supplying standard color burst signals and composite sync pulses; and iii. combining said standard signals and pulses from step (ii) with said digital signals from step (i).

42. The method of claim 41 wherein said step of reconverting further includes the steps of:

iv. supplying standard composite blanking signals in digital form; and v. adding said standard composite blanking signals from step (iv) with said digital singals before performing step (i).

43. The method of claim 26 wherein said step of storing includes the step of sequentially storing a maximum of M/N successive lines of said video type signals in individual ones of different sections of a memory unit, where M and N are integers; and said step of fetching includes the step of sequentially fetching successive lines of said video type signals in corresponding order from said individual ones of said different sections of said memory unit.

44. The method of claim 43 wherein M/N = 3.

45. The method of claim 43 further including the step of detecting an overlap condition in which said steps of storing and fetching are contemporaneously performed on the same individual section of said memory unit, and thereafter performing said fetching step on a different individual one of said different sections of said memory unit.

* * * * *

US003860952A

REEXAMINATION CERTIFICATE (2453rd)

United States Patent [19]

[11] B1 3,860,952

Tallent et al.

[45] Certificate Issued Jan. 17, 1995

[54] VIDEO TIME BASE CORRECTOR

[75] Inventors: Michael W. Tallent, San Jose; Lee E. Scaggs, Mountain View; Allan L. Swain, Palo Alto; Ronnie M. Harrison; William B. Hendershot, III, both of San Jose, all of Calif.

[73] Assignee: Video Patents Limited, San Jose, Calif.

Reexamination Requests:

No. 90/002,701, Apr. 20, 1992

No. 90/002,802, Jul. 29, 1992

No. 90/003,112, Jul. 1, 1993

Reexamination Certificate for:

Patent No.: 3,860,952

Issued: Jan. 14, 1975

Appl. No.: 381,463

Filed: Jul. 23, 1973

[51] Int. Cl.$^6$ ........................ H04N 5/76; H04N 5/95; H04N 9/02

[52] U.S. Cl. .................................... 348/498; 348/506; 348/715; 358/326

[58] Field of Search ............. 358/17, 19, 20, 320–326, 358/337–339, 148, 149, 160; 360/26, 36.1, 36.2; 348/498, 506, 715

[56] References Cited

U.S. PATENT DOCUMENTS

| | | | |
|---|---|---|---|
| 2,594,380 | 4/1952 | Barton et al. | 358/20 |
| 3,100,816 | 8/1963 | Coleman, Jr. et al. | 358/326 |
| 3,345,608 | 10/1967 | Brown et al. | |
| 3,347,997 | 10/1967 | Woodruff | 358/338 X |
| 3,371,158 | 2/1968 | Tanaka et al. | 358/148 |
| 3,384,707 | 5/1968 | Bopp et al. | 178/6.6 |
| 3,528,026 | 9/1970 | Groendycke | 331/11 |
| 3,578,902 | 5/1971 | Monsay | |
| 3,580,991 | 4/1969 | Krause | 358/19 |
| 3,587,007 | 6/1971 | Temes | |
| 3,617,626 | 11/1971 | Bluth | 358/11 |
| 3,659,040 | 4/1972 | Fujita | 358/19 |
| 3,666,880 | 5/1972 | Krause | 178/5.2 |
| 3,761,646 | 9/1973 | Beauviala | |
| 3,765,018 | 10/1973 | Heard et al. | 358/140 X |
| 3,820,154 | 6/1974 | Faroudja et al. | |
| 3,831,189 | 8/1974 | Shenk et al. | 360/8 |
| 3,850,513 | 11/1974 | Wrcy | 358/36 |
| 3,863,022 | 1/1975 | Bruch | |
| 3,879,748 | 4/1975 | de Boer | |
| 3,909,839 | 9/1975 | Inaba et al. | 358/8 |
| 4,600,945 | 7/1986 | Bolger | 358/242 X |

FOREIGN PATENT DOCUMENTS

| | | | |
|---|---|---|---|
| 45-16179 | 6/1970 | Japan | |
| 1355649 | 6/1974 | United Kingdom | H04N 5/78 |

OTHER PUBLICATIONS

DeMario et al., "Color Video Recording System for Elimination of Time Based Jitter" IBM TM Technical Disclosure Bulletin, vol. 13, No. 6, Nov. 1970, p. 1736.

Hannan et al., "Automatic Correction of Timing Errors in Magnetic Tape Recorders" IEEE Transactions on Military Electronics pp. 246–254 Jul.–Oct. 1965.

(Author unknown), "Television Standards Converter Using Digital Techniques" The Radio and Electronics Engineer, vol. 43, #3 pp. 230–232 Mar. 1973.

Klien et al. "Digital Time Base Error Compensator for Wide-Band Telemetry Recorder Reproducers", International Conference held Sep. 15–17, 1969.

*Videotape Recording Theory and Practice* by Joseph F. Robinson copyright 1975 Focal Press Limited.

*TV & Video Engineer's Reference* Book by K. G. Jackson & G. B. Townsend copyright 1991 Butterworth-Heinemann Ltd.

S. C. Chao, "Time Base Compensation in Magnetic Tape Recorders", Proceedings of the IEEE, Nov., 1966, pp. 1572, 1573.

[Author Unknown], "Digital Memory Calms Jittery T.V. Pictures", Electronics, Feb. 6, 1967, pp. 111–114.

R. C. Houts et al., "A Digital System for Compensating Time-Base Error in Analog Tape Recorders", IEEE Transactions on Communication Technology, vol. COM-18, No. 3, Jun. 1970, pp. 209–212.

J. L. E. Baldwin, "The Digital Future of Television Studio Centres", IBA Technical Review, Jun. 1973, pp. 124–130.

S. M. Edwardson, "The Digital Timing Correction of Video Tape Recorded Colour Television Signals", Pro-

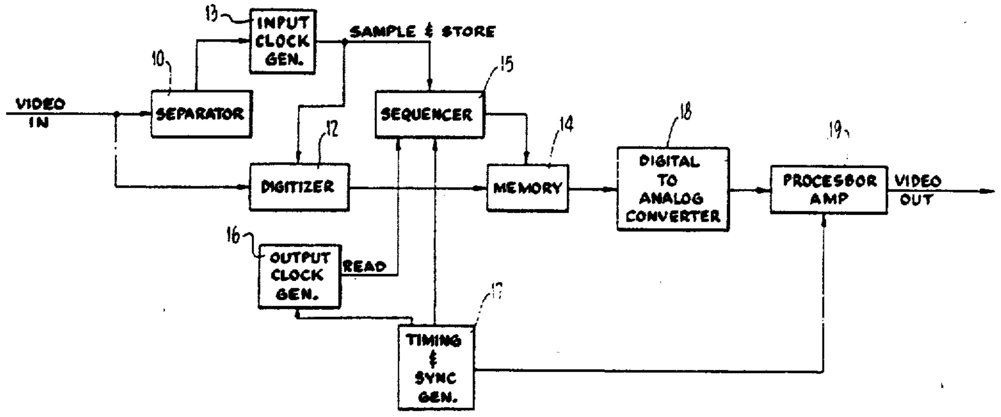

ceedings of the (IERE) Conference on Video and Data Recording, IERE Conference Proceedings No. 26, Jul. 12, 1973, pp. 27–39.
"A Digital Compensating Time-Base Error In Analog Tape Recorders", published Jun. 1970 in IEEE Transactions On Communications Technology.
"A Digital Technique For Time-Base Error Compensation" by Houts et al. published May 1969 In Proceedings Of IEEE.
"A New Technique For Time Base Stabilization Of Video Recorders" published Mar. 1971, IEEE Transactions On Broadcasting.
"Digital TV Synchronizers And Converters" by S. M. Edwards and A. H. Jones, published in Wireless World, Oct. 1971.
"Progress In Digital Television" published in May/-Jun., 1971, issue of The Royal Television Journal.
"Digital Time-Base Correction for Video Signal Processing" by Acker et al. presented January 24, 1969 at the Society's Technical Conference. p69–73.
"Videotape Recording—Theory and Practice" by Joseph F. Robinson published 1975, Focal Press Ltd. p169–185,

*Primary Examiner*—James J. Groody
*Assistant Examiner*—David E. Harvey

[57] ABSTRACT

A time base corrector for processing television signals to remove time base errors introduced during signal recording, reproducing, or transmission. Incoming video signals are converted from analog to digital form and temporarily stored in a memory unit. Time base errors are removed from the video signals by storing the digitized signals at a clocking rate which varies in a manner generally proportional to the time base errors and fetching these stored signals at a standard clocking rate. The clocking signal for storing the digitized information is derived from an input voltage controlled oscillator whose frequency is dependent upon the frequency content of the instantaneous incoming video line information; the clocking signal for fetching is derived from a frequency standard. After storage and retrieval, the digitized video information is reconverted to analog form, processed and coupled to an output terminal.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-25, 27, 29-37 and 39-45 is confirmed.

Claims 26, 28 and 38 are cancelled.

* * * * *

US003860952B2

REEXAMINATION CERTIFICATE (2864th)

United States Patent [19]

Tallent et al.

[11] B2 3,860,952

[45] Certificate Issued May 7, 1996

[54] VIDEO TIME BASE CORRECTOR

[75] Inventors: Michael W. Tallent, San Jose; Lee E. Scaggs, Mountain View; Allan L. Swain, Palo Alto; Ronnie M. Harrison, San Jose; William B. Hendershot, III, San Jose, all of Calif.

[73] Assignee: J. Carl Cooper, Monte Sereno, Calif.

Reexamination Request:
No. 90/003,435, May 10, 1994

Reexamination Certificate for:

| | |
|---|---|
| Patent No.: | **3,860,952** |
| Issued: | **Jan. 14, 1975** |
| Appl. No.: | **381,463** |
| Filed: | **Jul. 23, 1973** |

Reexamination Certificate B1 3,860,952 issued Jan. 17, 1995

[51] Int. Cl.$^6$ ............................... H04N 5/76; H04N 5/95

[52] U.S. Cl. .......................... 348/498; 348/506; 348/715; 358/326

[56] References Cited

U.S. PATENT DOCUMENTS

| | | |
|---|---|---|
| 3,469,032 | 9/1969 | Dorsey et al. . |
| 3,528,026 | 9/1970 | Groendycke . |
| 3,578,902 | 5/1971 | Monsay . |
| 3,659,040 | 4/1972 | Fujita . |
| 3,666,880 | 5/1972 | Krause . |
| 3,742,135 | 6/1973 | Baldwin . |
| 3,860,952 | 1/1975 | Tallent et al. . |
| 3,900,885 | 8/1975 | Tallent et al. . |
| 4,051,531 | 9/1977 | Baldwin . |
| 4,212,027 | 7/1990 | Lemoine . |

OTHER PUBLICATIONS

J. L. E. Baldwin et al., "A standards converter using digital techniques," The Royal Television Society Journal, Jan./Feb. 1972, vol. 14, No. 1, pp. 1–11.

Ronald C. Houts et al., "A Digital System for Compensating Time–Base Error in Analog Tape Recorders," IEEE Transactions on Communication Technology, vol. Com–18, No. 3, pp. 209–213.

G. DeMario et al., "Color Video Recording System for Elimination of Time Based Jitter," IBM Technical Bulletin, vol. 13, No. 6, Nov. 1970, p. 1736.

S. M. Edwardson et al., "Digital TV Synchronizers and Converters," Wireless World, Oct. 1971, pp. 479–482.

*Primary Examiner*—Safet Metjahic

[57] ABSTRACT

A time base corrector for processing television signals to remove time base errors introduced during signal recording, reproducing, or transmission. Incoming video signals are converted from analog to digital form and temporarily stored in a memory unit. Time base errors are removed from the video signals by storing the digitized signals at a clocking rate which varies in a manner generally proportional to the time base errors and fetching these stored signals at a standard clocking rate. The clocking signal for storing the digitized information is derived from an input voltage controlled oscillator whose frequency is dependent upon the frequency content of the instantaneous incoming video line information; the clocking signal for fetching is derived from a frequency standard. After storage and retrieval, the digitized video information is reconverted to analog form, processed and coupled to an output terminal.

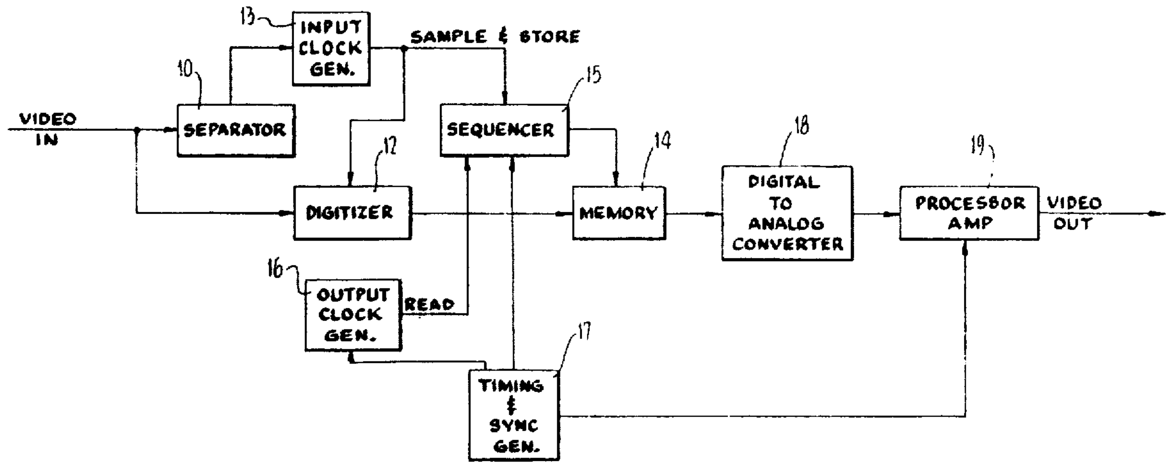

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–25, 27, 29–37 and 39–45 is confirmed.

Claims 26, 28 and 38 were previously cancelled.

* * * * *